Patented Sept. 1, 1942

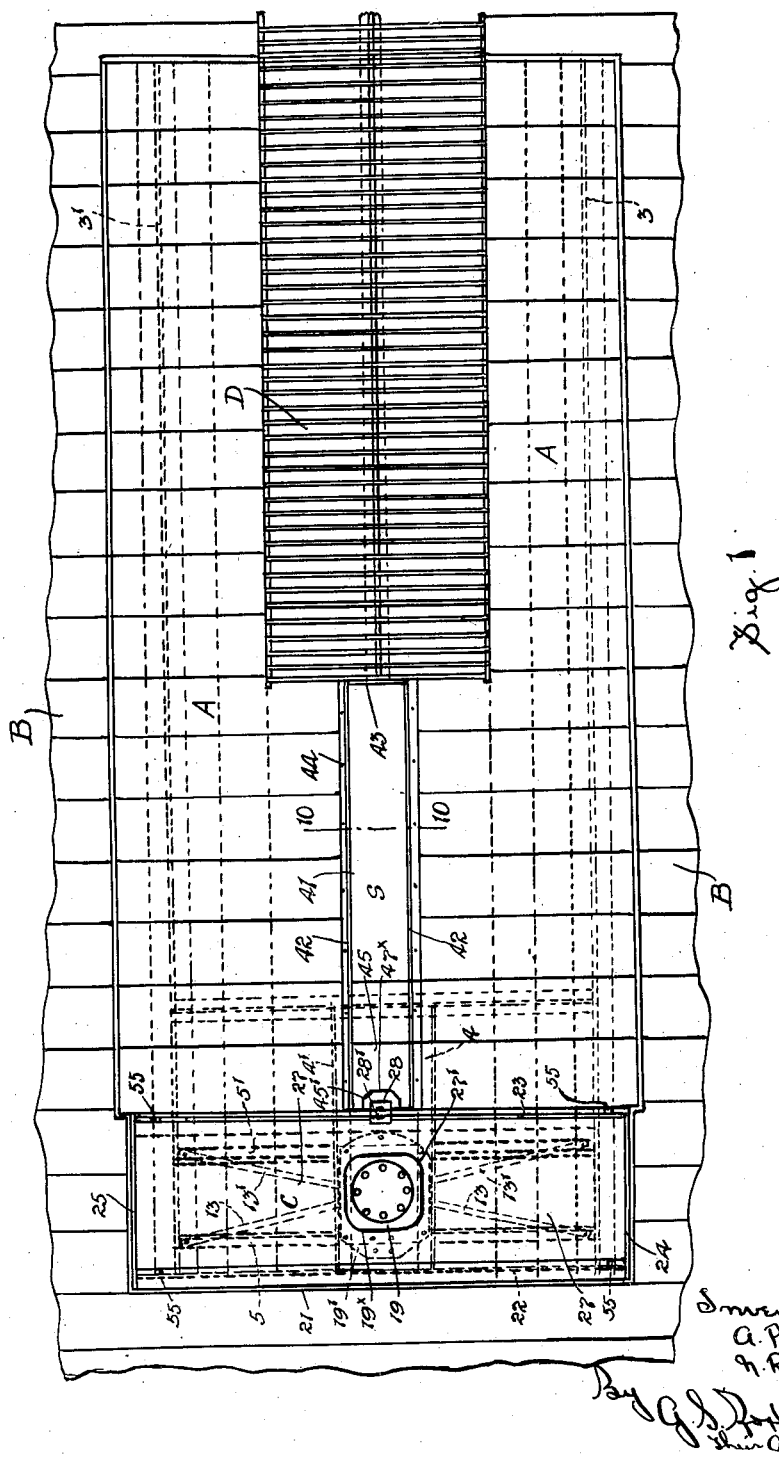

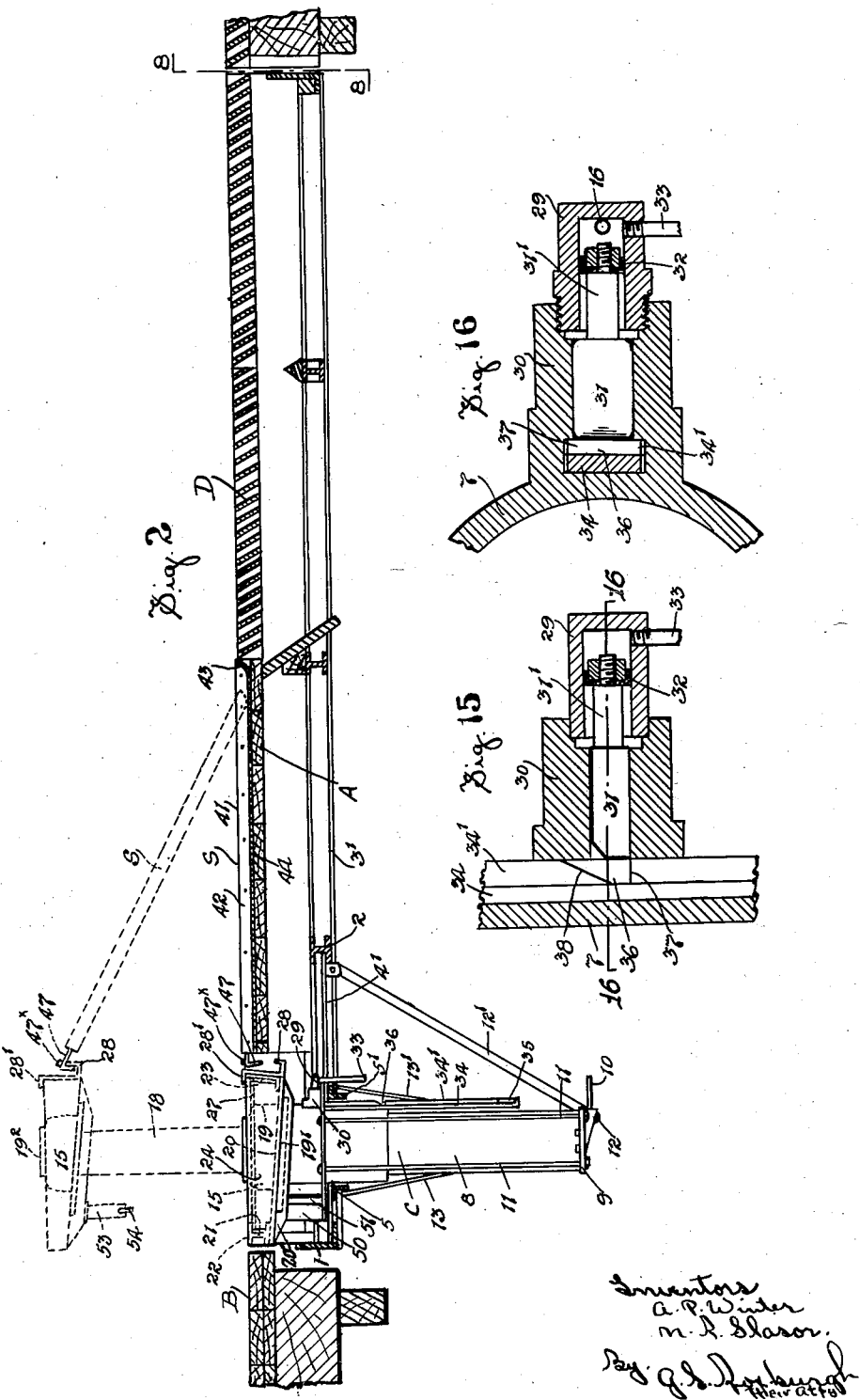

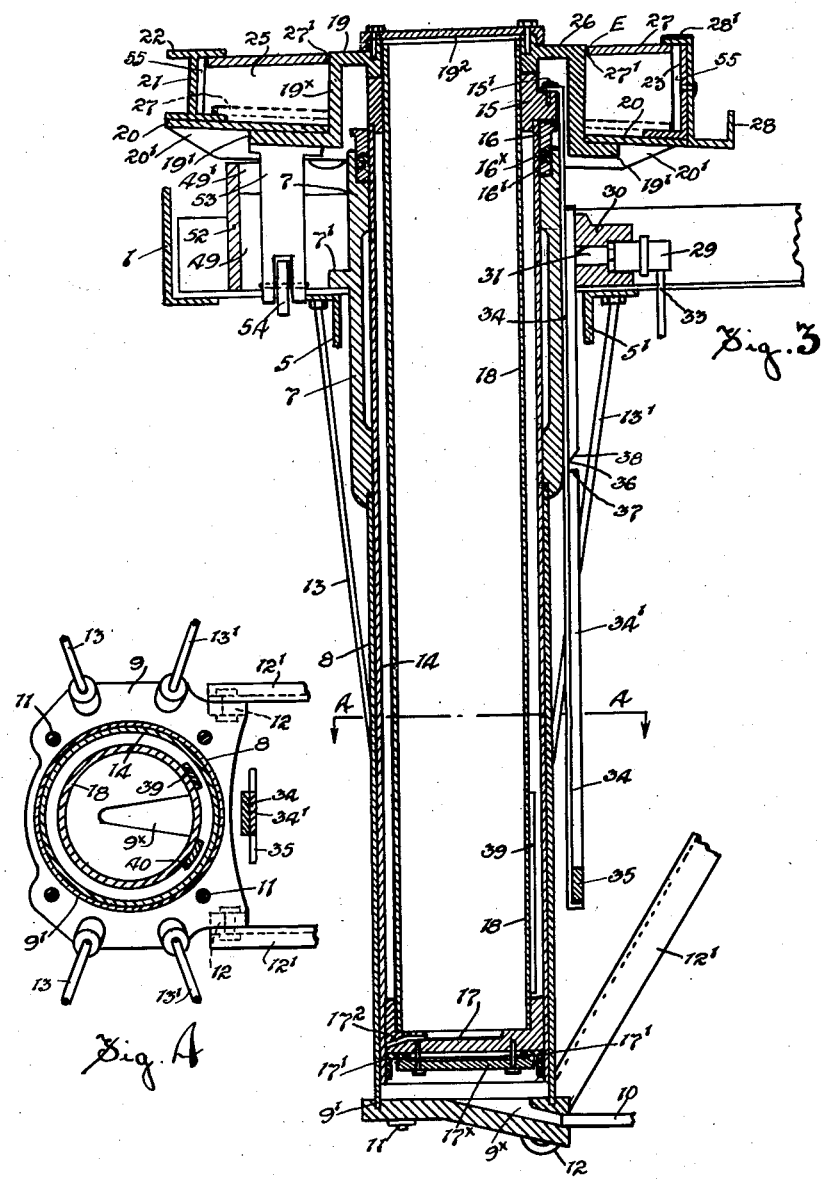

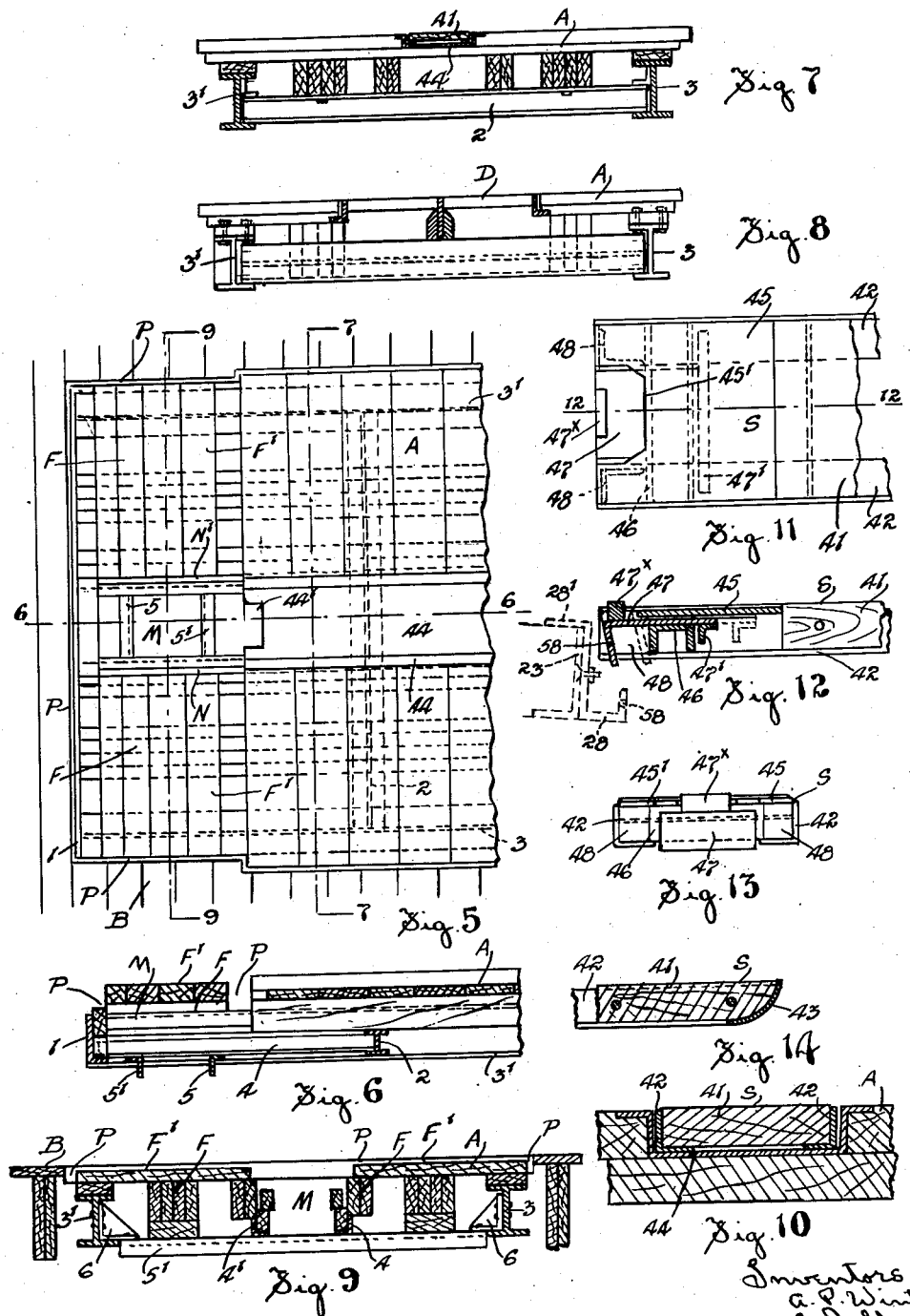

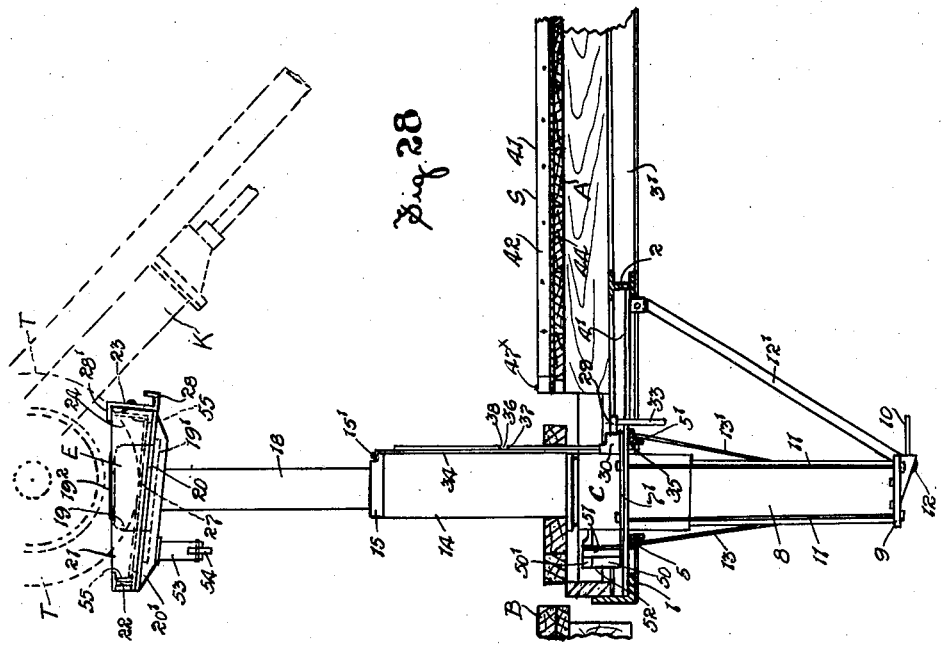
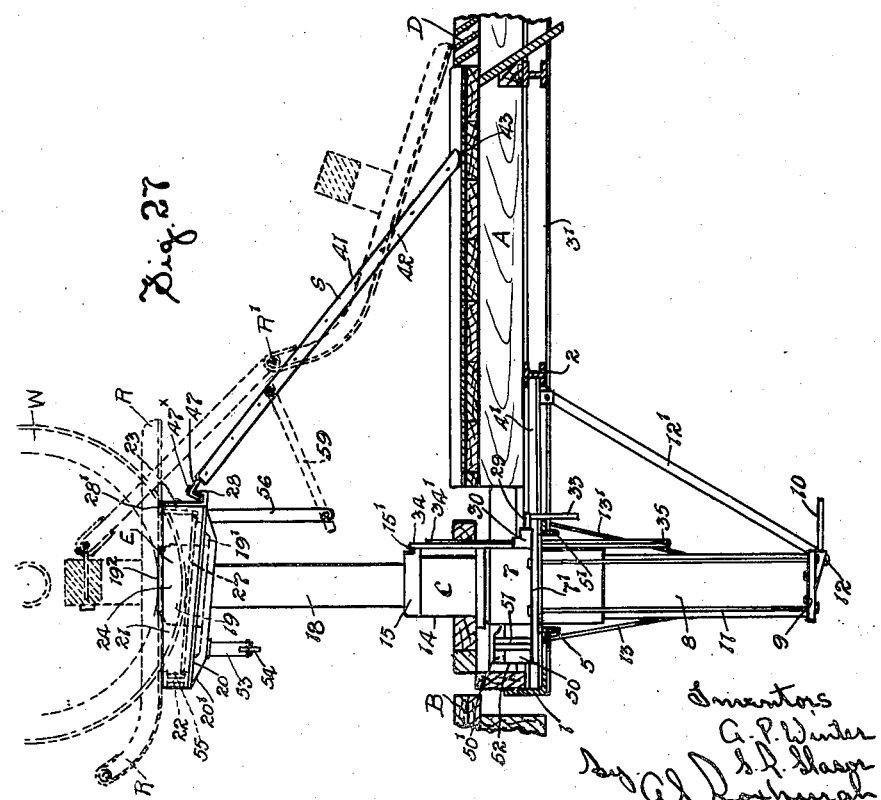

2,294,531

UNITED STATES PATENT OFFICE 2,294,531

TELESCOPIC DUMP FOR SCALE PLATFORMS

August P. Winter, St. Vital, and Nicholas Robert Slasor, Winnipeg, Manitoba, Canada; said Slasor assignor to said Winter Application April 17, 1940, Serial No. 330,142
In Canada April 24, 1939

4 Claims. (Cl. 214—46.5)

The invention relates generally, to pneumatic dumps, particularly adapted for use in connection with scale platforms and utilized for tilting into load dumping position, vehicles of varying length and character, such as for example, motor trucks, wagons and sleighs.

An object of the invention is to provide a scale platform dump which will effectively accommodate, not only the average vehicle driven thereon, but also those of exceptionally long wheel base, which latter require to be lifted relatively high in order to obtain the necessary dumping angle, and this without requiring the provision of an undesirably deep pit to accommodate those parts of the dump suspended from and underlying the forward portion of the platform.

A further object is to provide the pneumatic dump with a short stop which can be set to automatically stop the rising dump or hoist at a height suitable for dumping sleighs, wagons and short wheel base trucks and which can also be used, when the short stop is not functioning, to elevate and hold at the desired dumping height, those vehicles of longer wheel base and including the exceptionally long ones sometimes encountered.

A further object is to construct the short stop so that the dump is free to lower from short stop position without interference by the short stop.

A further object is to provide a dump including an outer vertical cylinder mounted rigidly and carried by the platform, a sleeve slidably mounted within the outer cylinder, a piston operating in the sleeve, a piston rod rising from the piston and provided with means for raising the sleeve in the up movement of the piston and a vertically movable cradle carried by the upper end of the piston rod and normally retired within the scale platform and embodying a free, wheel receiving, plate normally supported by the scale platform in a horizontal position approximately in the plane of the upper face of the scale platform. A further object is to provide an exterior guide bar for preventing rotary movement of the sleeve within the outer cylinder and to supply the guide bar with a peculiarly shaped notch for receiving the short stop and with a stop bar for positively limiting the ultimate raised position of the hoist.

A further object is to provide the hoist with a cradle especially designed so that when raised from the scale platform it automatically locks the front wheels of a vehicle carried thereby and such that there is no possibility of the crank case of a truck fouling the cradle in either the raising or lowering movement of the cradle.

A further and more detailed object is to provide a cradle for the hoist having a free, wheel receiving plate, adapted to take a rearwardly and downwardly inclining position in the base of the cradle frame when the cradle initially rises from the scale platform, such acting in the continued rising movement of the cradle to gravitate the vehicle wheels carried thereby, rearwardly and into contact with the cradle frame and so positively prevent the fouling of vehicle parts, such as the crank case of a truck with the rear of the cradle frame.

A further object is to provide a cradle having a single or one piece wheel receiving plate which gives ample lateral room for a careless driver to drive onto the same without encountering obstructions, insures of uniform movement of the plate and reduces to a minimum the possibility of jamming the cradle frame.

A further object is to provide the piston rod with a dome shaped head forming a support for the cradle and serving also as a central guide for the upwardly movable wheel supporting plate and as a guard to prevent dust from the pit lodging on the upper ends of the piston rod and inner cylinder.

A further object is to provide the latter head with a removable cover plate giving ready access to the interior of the cylindrical piston rod for repair purposes.

A further object is to provide the front and rear portions of the cradle with striker bars engageable with the movable plate and serving to prevent jamming of the plate in the frame.

A further object is to provide a hoist wherein the rising cradle is automatically turned into alignment with the front wheels of a vehicle carried thereby under a condition where the said wheels are initially angularly disposed in a direction across the cradle and further to supply means for positively spotting or directing the turned lowering cradle back into its original position within the scale platform.

A further object is to provide a construction which allows of the easy and quick removal of a piston out of the lower end of the hoist and of the removal in an upward direction of the piston rod and the sleeve without interfering with the outer cylinder, its mounting or brace members.

A further object is to provide means whereby the waters of condensation can be readily cleared from the lower end of the piston rod and subsequently drained from the outer cylinder.

A further object is to provide a construction which requires a minimum amount of air for operating purposes and wherein there is no stage during the rising movement of the hoist, where the movement is appreciably stopped, while the air pressure builds up. A further object is to provide a sleigh attachment for use with the hoist, such attachment extending lengthwise of the scale platform and normally lying in a non-obstructive position with its upper face approximately flush with the upper face of the scale platform and to supply the hoist cradle and the sleigh attachment with simple and positive means whereby they can be quickly coupled together.

A more detailed object is to provide a sleigh attachment normally resting in a lengthwise extending channel supplied in the scale platform and to supply the front end of said attachment with a sliding hooked bar adapted when shifted in a proper direction by the attendant, to bring the hook of the bar into a position where it will interlock with an overlying hooked catch secured to the cradle.

A further object is to arrange the hoist and the scale platform so that when the hoist is raised from the platform there will be no opening of sufficient extent exposed in the platform which might cause accident to attending persons or draft animals.

A further object is to provide a construction wherein the air sealing means between the sleeve and outer cylinder, is located at the upper end of the outer cylinder, such permitting of the easy unobstructed removal of the piston air sealing cup and follower plate for cup replacement purposes, upon detachment of the base cap of the outer cylinder.

A further object is to provide means, associated with the cradle and the sleigh attachment adapted to cause the attachment to be lifted by the rising cradle clear of the platform when the said attachment has reached a desired angular position in relation to the platform.

With the above more important and other minor objects in view, which will become apparent as the description proceeds, the invention consists essentially in the arrangement and construction of parts hereinafter described, reference being had to the accompanying drawings in which:

Fig. 1 is a plan view of the dump.

Fig. 2 is a longitudinal vertical sectional view centrally through the dump and showing the cradle in down position and in dotted outline in an up position.

Fig. 3 is an enlarged vertical sectional view centrally through the hoist and showing the load plate or pan of the cradle in its up position.

Fig. 4 is a cross sectional view at 4—4 Fig. 3 and looking downwardly with the piston removed.

Fig. 5 is a plan view of the front end of the scale platform with the hoist parts removed.

Fig. 6 is a vertical sectional view at 6—6 Fig. 5.

Fig. 7 is a vertical sectional view at 7—7 Fig. 5.

Fig. 8 is a vertical sectional view through the grates.

Fig. 9 is a vertical sectional view at 9—9 Fig. 5.

Fig. 10 is an enlarged detailed vertical sectional view at 10—10 Fig. 1.

Fig. 11 is an enlarged detailed plan view of the front end of the sleigh attachment.

Fig. 12 is a vertical sectional view at 12—12 Fig. 11.

Fig. 13 is a front end view of the parts appearing in Fig. 11.

Fig. 14 is an enlarged detailed vertical sectional view centrally through the tail end of the sleigh attachment.

Fig. 15 is an enlarged vertical sectional view through the short stop, certain parts appearing in side elevation.

Fig. 16 is a horizontal sectional view at 16—16 Fig. 15 certain parts appearing in plan.

Fig. 26 is a vertical sectional view centrally through the packing ring.

Fig. 27 is a view similar to Fig. 2 with the hoist shown in the position where it is positively stopped by the short stop.

Fig. 28 is a view similar to Fig. 27 but with the hoist shown in its most elevated position.

In the drawings like characters of reference indicate corresponding parts in the several figures.

Figure 17:
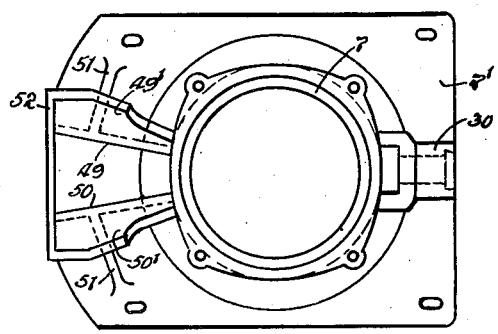
Fig. 17 is an enlarged detailed plan view of the bearing for the outer cylinder of the hoist.
Figure 18:
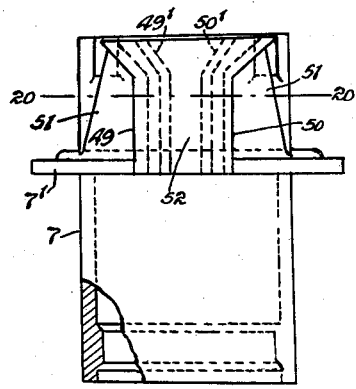
Fig. 18 is a front view of the latter bearing.
Figure 20:
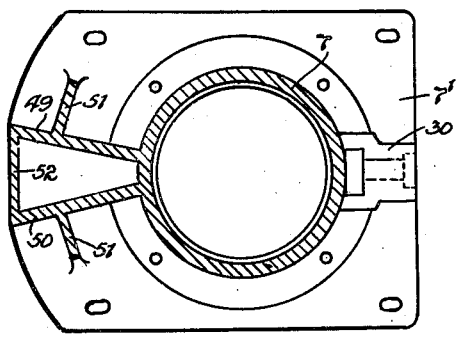
Fig. 20 is a horizontal sectional view at 20—20 Fig. 18.
Figure 19:
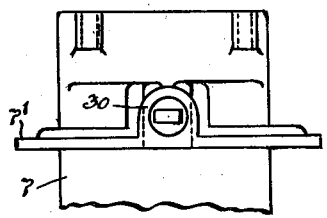
Fig. 19 is a rear view of the upper part of the latter bearing.
Figure 22:
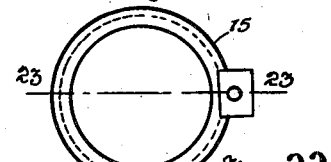
Fig. 22 is a detailed plan view of the bearing ring for the upper end of the sleeve of the hoist.
Figure 21:
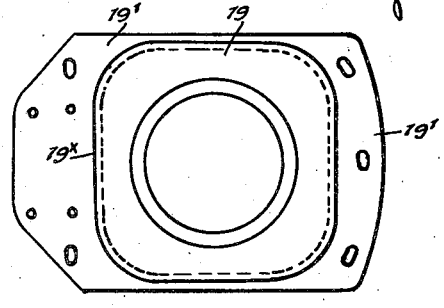
Fig. 21 is an enlarged detailed plan view of the head for the piston rod of the hoist.
Figure 25:
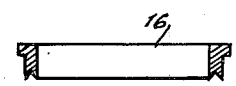
Fig. 25 is a vertical sectional view at 25—25 Fig. 24.
Figure 23:
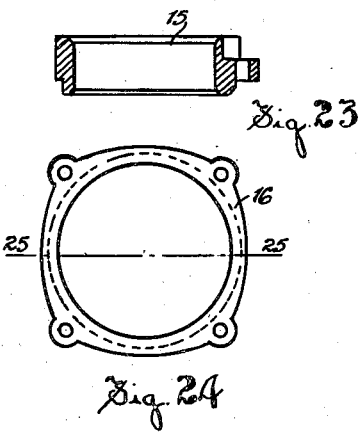
Fig. 23 is a vertical sectional view at 23—23 Fig. 22.
Figure 24:
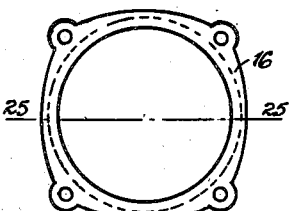
Fig. 24 is a plan view of the packing gland.

The scale platform A is mounted in the well known manner in the weigh house floor B and onto it is driven the loaded vehicle to be weighed. Within the scale platform is mounted a hoist, generally indicated by the letter C and the hoist is used to raise the front end of the vehicle to dump the load through the grates D in the platform and the weigh house floor, and into an underlying hopper.

The hoist is suspended entirely from the scale platform and is so designed that the upper face of the cradle thereof, in the fully down position of the hoist, lies approximately flush with the upper face of the scale platform.

The scale platform understructure presents a transverse angle iron 1 and a transverse eye beam 2 spaced therefrom, these being permanently secured to the main side beams 3 and 3' of the scale platform. The angle iron 1 and the beam 2 support a pair of centrally located, spaced, lengthwise extending angle bars 4 and 4' and beneath these are located a further pair of spaced, transversely extending angle bars 5 and 5' which have their ends fastened by angle brackets 6 to the side beams (see Fig. 9).

In the manner just described there is supplied a very firm support beneath the level of the floor boards of the scale platform for carrying the vertical bearing 7 for the outer cylinder 8 of the hoist.

The bearing 7 is in the form of an enlongated sleeve adapted to pass through the opening provided between the intersecting bars 4, 4' and 5, 5' and it is supplied with a horizontal flange or base plate 7' which rests upon and is firmly fastened to the bars 4 and 4'.

The upper end of the outer cylinder 8 fits into the lower end of the bearing 7 (see Fig. 3) and the lower end of the cylinder is closed by a base cap 9 channelled at 9' in its upper face to receive the cylinder and provided with an outlet duct 9× for connection with an air line indicated at 10. The cap and base plate are firmly connected together by vertical tie rods 11. The cap is also supplied with side lugs 12 to which the lower ends of angularly disposed brace bars 12' are fastened, said bars having their upper ends permanently secured in any suitable manner to the rear ends of the bars 4 and 4'. Upwardly diverging pairs of brace rods 13 and 13' connect the cap with the side beams 3 and 3' of the main frame at the points where the bars 5 and 5' are attached to the frame.

According to the above the hoist has the main or outer cylinder thereof centrally underlying the forward end of the scale platform and rigidly suspended from the same and effectively braced.

A sleeve 14 is slidably mounted for vertical movement within the outer cylinder, the lower end of the sleeve being open and the upper end thereof being supplied with a bearing ring 15 permanently secured thereto. The upper end of bearing 7 is rabbeted to receive a packing gland 16 and a packing ring 16' and a suitable packing material 16× is interposed therebetween, such arrangement insuring of a leakproof, sliding joint between the sleeve and the latter bearing.

Within the sleeve operates the piston 17 which is provided with the usual piston rod 18 preferably of hollow cylindrical form. The piston rod extends slidably through the ring 15 and the projecting upper end thereof carries the cradle indicated generally by the reference letter E and utilized in the upward movement of the piston rod, to raise and lock the forward end of a vehicle imposed thereon.

The cradle comprises those parts now described in detail. A dome shaped head 19 is permanently secured to the upper end of the piston rod, such presenting a depending body 19× and an outstanding inclined flange 19', the rear end of the said flange being somewhat lower than the forward end. Actually the flange makes an angle of approximately five degrees to the horizontal. A cover plate 19² encloses the top of the head and is removable.

A base plate 20 is securely bolted to the flange 19' said base plate being reinforced by down turned side flanges 20'. A transversely, extending, rectangular skeleton frame 21 is permanently secured to and supported by the base plate 20, such comprising the forward transverse eye beam 22, the rearward transverse angle beam 23 and the connecting end bars 24 and 25. It will be observed that the web of the eye beam is less in height than the up-going flange of the angle beam, the arrangement being such that the upper tip of the latter flange and the under side of the upper, inner flange of the eye beam are substantially in the horizontal plane containing the upper face 26 of the head 19.

A vertically shiftable, rectangular load plate or pan 27 is contained within the skeleton frame and has an opening 27' centrally thereof to freely receive the body 19× of the head 19. The front edge of the load plate underlies the upper inner flange of the beam 22 and the rear edge thereof is prevented from escaping from the angle beam by the horizontal tip 28' of the hooked shaped catch 28 secured centrally and permanently to the angle beam. The load plate can be suitably reinforced on its under side.

I wish now to refer to Figs. 1 and 2 wherein the cradle is shown in its fully down position, and where it will be noted that its upper face lies approximately flush with the upper face of the scale platform. In order to maintain the movable load plate 27 in a position approximately in the plane of the top face of the scale platform, when the cradle is in its fully down position, it is necessary to provide an under structure, permanently carried by the scale platform, and adapted to engage the under side of the plate 27 and arrest it in approximately the plane of the upper face of the scale platform. With such an arrangement, the load plate will be held in the desired horizontal up position (as shown in Fig. 3) and the remainder of the cradle can continue to descend, in the lowering of the piston rod, until the top face of the skeleton frame thereof is approximately on a level with the upper face of the scale platform or as shown in Fig. 1. Conversely, should the piston rod move the cradle up from the position shown in Fig. 1 it will be apparent that the load plate will remain stationary until it is picked up by the rising lower flanges of the beams 22 and 23 and as these latter are in different horizontal planes the load plate will then be in a rearwardly and downwardly inclining or canted position.

The means herein shown for arresting the downward movement of the load plate, is best shown in detail in Figs. 5, 6 and 9 of the drawings where it will be observed that an under filler structure of wooded beams, generally indicated at F, is provided, such being supported in any suitable manner from the main frame of the scale platform. This filler structure is so arranged that there is a central open space reserved at M to accommodate the bearing 7, side slots reserved at N and N' to receive the flanges 20' of the plate 20 and a surrounding open space reserved at P to receive the skeleton frame 21. The upper faces of the beams F' of the filler structure which actually stop the down movement of the load plate are contained in a horizontal plane slightly below that containing the scale platform, with the result that the load plate in the down position of the hoist, lies approximately in the plane of the upper face of the scale platform. Obviously any other means carried by the scale platform could be used to arrest the load plate and amply support it in the fully down position, but the filler structure herein disclosed provides further a minimum of open space at the front end of the scale platform when the cradle is in a raised position and so functions as an effective means for preventing accident or damage to persons or draft animals.

In order to stop the cradle in an intermediate up position, such as is desired for unloading wagons and sleighs, there is provided what is termed a short stop which is now described in detail. A relatively short cylinder 29 (see Figs. 15 and 16) is supplied, which is screw threaded into the rear end of the boss 30, integrally cast with bearing 7 and the boss receives slidably a dog or stop 31 provided with a stem 31' extending into the cylinder. The rear end of the stem carries a piston 32 operating in the cylinder and a pipe 33 leads from the outer end of the cylinder and communicates with a valve controlled source of compressed air supply.

A guide bar 34 passes slidably and vertically through the boss and the flange 7' of the bearing 7 and has its upper end permanently secured at 15' to the rear side of the ring 15 and its lower end fitted with a detachable stop bar 35. To the guide bar a further bar 34' is permanently secured, which latter bar is supplied with a notch 36 which presents a right angled shoulder 37 and an overlying sloping face 38. The notch is positioned such that when the cradle has been raised to the desired short stop position the dog or stop under the influence of the air pressure applied in the cylinder 29, will enter the notch and positively prevent further rising movement of the cradle. The nose of the dog is shaped complementary to the notch so that in the down movement of the bar 34' the sloping face 38 of the bar will automatically force the dog outwardly and allow the cradle to move down. These bars 34 and 34' serve also to prevent rotary movement of the sleeve 14 at all times, in relation to the outer cylinder 8. The stop bar 35 by contact with the under side of the flange 7' serves to limit the uppermost position of the cradle. If desired a number of notches could be made in the bar.

The piston rod 18 has a pair of vertically disposed stop bars 39 and 40 permanently secured to its outer face, at the rear, and these are used to limit the up travel of the piston rod within the sleeve 14, by contact of the upper ends of the said bars with the ring 15 of the sleeve.

Assuming that air under pressure is admitted to the lower end of the outer cylinder 8 and also to the short stop cylinder 29, the piston 17 and the piston rod 18 will rise within the sleeve until the stop bars 39 and 40 engage the ring 15 and then the piston rod will carry the sleeve 14 upwardly with it until the notch 36 opposes the dog, at which time the dog enters the notch and engages the stop shoulder 37 and positively stops further up movement. Subsequently upon the air being exhausted from the cylinder 8 the hoist will lower to its original position, the slanting face of the notch automatically forcing the dog outwardly. If it is initially desired that the hoist rise further than the position controlled by the short stop, air is not initially admitted to the cylinder 29 but only to the lower end of the cylinder 8. Under such a condition, the piston and piston rod will initially rise within the sleeve, then the sleeve will be picked up by the stop bars 39 and 40 and thereafter the piston and the sleeve will continue to rise together to whatever height is desired, this depending upon the time at which the air fed to the outer cylinder is shut off and it being understood that the ultimate height to which the hoist can rise is positively limited by the stop bar 35 engaging with the flange 7'.

The dump is provided with a sleigh attachment generally indicated at S which is utilized to support the forward portion of the rear sleigh runners when the front end of the sleigh is being raised by the hoist. This attachment is now described in detail reference being made particularly to Figs. 10 to 14 of the drawings. It comprises a lengthwise extending plank 41 which has the sides thereof reinforced by angle bars 42 and the rear end rounded and guarded by a metal shoe 43. This plank is approximately seven feet long and lies when not in use in a channel bar 44 countersunk in the scale platform, the arrangement being such that the plank has its upper face at such time approximately in the plane of the upper face of the platform to present no undesirable obstruction. The angle bars 42 extend forwardly beyond the front end of the plank and are connected by a horizontal filler plate 45 and a channel iron 46 spaced from the plate. A hooked bar 47 is slidably mounted between the plate and the channel iron, such bar being provided with a rear striking strip 47' and a forward foot piece 47$^x$. The plate is cut away at 45' as is also the bar 44 at 44' (see Fig. 5) to allow the catch 28 to pass through when the hoist raises and angle plates 48 are welded to the front ends of the side bars 42 to close them and form side guides for the hooked bar. When the sleigh attachment is not in use it lies in the channel 44 and has the hooked bar 47 thereof in the rear position as shown in dotted outline in Fig. 12. In this dotted position of the hooked bar, the sleight attachment remains idle in the scale platform, as the hoist cradle rises, for the reason that the hooked bar is clear of the catch 28 as the latter rises through the openings 44' and 45'. When it is desired to have the front end of the sleigh attachment carried up by the cradle, the hooked bar 47 is kicked forward to the position shown in full outline in Fig. 12, in which position it will be caught by and carried up with the catch, the shoe at the rear end of the plank meantime trailing in the channel bar 44.

It will be observed that the raised cradle can be rotated in the horizontal plane as it is carried by the piston rod 18 which can rotate freely within the sleeve 14. In order to insure that the cradle will pass into its proper position within the scale platform, when it is being lowered, the cradle and platform are provided with members adapted to engage as the cradle lowers and after engagement to centre the cradle if such be necessary. In the structure herein shown the member associated with the platform is actually cast integrally with bearing 7 and presents a pair of spaced vertical guides 49 and 50 which carry upwardly diverging deflecting wings 49' and 50' the wings and guides being reinforced by suitable ribs 51 and a web 52. The member associated with the cradle is in the form of a vertical arm 53 permanently secured to the underside of the flange 19' and provided at its lower end with a roller 54 adapted to engage with the wing 49' or that 50' and then pass down between the guides. The latter members are so located that the down moving cradle is at all times effectively and positively guided into its proper position in relation to the scale platform.

This telescopic dump or hoist will accommodate all types of vehicles requiring to be dumped. Should a sleigh require to be dumped it is driven centrally onto the scale platform with the front runners thereof crossing and resting on the extending ends of the beams 22 and 23 of the cradle. The operator having previously kicked the hooked bar 47 fully ahead, then admits compressed air to the cylinders 8 and 29 and the cradle immediately rises until it is automatically stopped by the short stop (shoulder 37 and dog 31). At such time the front runners R of the sleigh (see Fig. 27) have been elevated sufficiently to effectively dump the sleigh load through the grates. The sleigh will remain in dumping position as long as air pressure is maintained in the cylinder 8. Upon the air being exhausted from the latter cylinder the cradle lowers under the dead load and takes its original position in the scale platform and during such movement the sloping face of the notch 38 forcibly expels the dog 31. In the up movement of the cradle the catch 28 engages the hooked bar 47 of the sleigh attachment S and the front end of the said attachment then moves up with the cradle while the rear end thereof slides forwardly in the channel 44. The rising plank 41 will engage the forward cross bar R' of the rear runners of the sleigh and will accordingly effectively raise the front ends of the rear runners and eliminate strain on the joining beam between the front and rear runners which otherwise might be broken or damaged. The sleigh attachment acts to maintain the cradle centered in its up and down movement so that when a sleigh is being dumped the centering roller 54 does not require to function.

When a wagon having relatively large wheels, is to be dumped it is driven onto the scale platform in the same manner as a sleigh the front wheels however resting on the extending ends of the plate 27 of the cradle, which plate is supported at such time by the filler structure F. The hooked bar is previously kicked back so that the sleigh attachment will not rise with the cradle and then air under pressure is admitted to the cylinders 8 and 29. The cradle rises as before, until it is stopped by the short stop, where it will remain as long as air pressure is maintained. Upon the air being exhausted the cradle moves down under the dead load and at this time the roller 54 and wings 49' and 50' function to spot or centre the cradle in the scale platform.

It is now pointed out that at the time the plate 27 is picked up by the lower flanges of the beams 22 and 23 of the cradle, the wagon wheels are resting on and are being carried by the said beams with the result that the front wheels are effectively locked against movement on the cradle during the remaining up and down movement of the cradle. The elevated large front wheels of a wagon are shown at W in Fig. 27.

In practice it is quite common for a driver to drive a wagon onto a scale platform with the wagon in an angular position in respect to the longitudinal axis of the platform. At such time the front wheels will be angled across the cradle and this results in the cradle being rotated slightly around its vertical axis at the time the wagon wheels are engaged by the beams 22 and 23. The cradle will remain in this slightly rotated position as it subsequently rises and lowers and accordingly it is necessary to have some provision to spot or centre the cradle as it is approaching the scale platform in its down movement and this is accomplished by the roller 54, the deflecting wings 49' and 50' and the guides 49 and 50. Note that the sleigh attachment is not being used at this time. Wagons with smaller front wheels than those shown in Fig. 27 act practically the same as motor truck wheels now to be described.

Motor trucks vary materially in wheel base but this dump will accommodate all kinds and types and especially those having a long wheel base and which require to be raised relatively high to obtain the necessary dumping angle. When a truck is to be dumped it is driven onto the scale platform with the front wheels resting on the extending ends of the plate 27 the same as a wagon. The sleigh attachment is not used, nor is the short stop, no air being admitted to the cylinder 29. When air under pressure is admitted to the cylinder 8 the cradle rises and picks up the plate 27 which at such time is carrying the front wheels of the truck. The front wheels indicated at T, Fig. 28, can be elevated by the rising cradle to an effective dumping position, depending on the length of the wheel base of the truck. When that position is reached no further air is admitted to the cylinder 8 and the cradle remains in the up position. Upon the air being exhausted from the latter cylinder the cradle returns to its original position.

In regard to truck wheels, it is pointed out that they are of considerably less diameter than the average wagon wheels, their relative size being approximately indicated in Figs. 27 and 28. Accordingly when the plate 27 is picked up by the flanges of the beams 21 and 23 and assumes the canted position, it causes the truck wheels to roll back against the flange of the beam 23 and such beam and the canted plate, then form an effective wheel lock. This same roll back movement is also of special advantage in insuring that the truck crank case K (see Fig. 28) will not foul the beam 23 of the rising cradle, particularly where a truck of relatively short wheel base is being dumped, and the arrangement is also very desirable as the sloping plate 27 resists forward rolling of the wheels as the cradle lowers and so avoids fouling of the crank case on the downward movement. This feature will be best appreciated if one considers the plate to be held horizontal in the rising and lowering movement of the cradle. Under such a condition there is every possibility of the wheels rolling forward on the plate until stopped by the beam 21 which would definitely result in the fouling of the crank case with the beam 23. The rotary movement of the cradle around its vertical axis where a truck is angularly disposed on the platform and cradle, is the same as already described in connection with a wagon and accordingly the roller 54, deflecting wings 49' and 50' and guards 49 and 50 function to spot the descending cradle in the platform.

The dome shaped head 19 acts as a central guide for the movable plate 27, preventing lateral and end shifting movement thereof, and also serves to prevent pit dust from accumulating on the upper parts of the hoist which it encloses. Further as the head is relatively small in relation to the length of the plate there is ample room for a careless driver to drive onto the plate without one wheel fouling the head.

The single plate 27 has the distinct advantage that it insures of uniform plate movement, less liability to jam in the containing frame under normal conditions and gives a maximum of wheel receiving area. It will be observed that the said plate has clearance in regard to the beams 21 and 23 and can consequently rotate slightly within the frame, turning around the head 19. In order to insure against jamming of the plate in the frame, under normal conditions, the webs of the frame bars 21 and 23 are supplied adjacent the corners of the frame with permanent upwardly extending striker or rubbing bars 55. These prevent the corners of the plate from striking and digging into the latter webs and act as guides for the plate in the latter's vertical movement.

Referring now to Fig. 3 it will be particularly noted that the packing 16$^\times$ forms the air seal between the sleeve 14 and the outer cylinder so that there is nothing at the lower end of the sleeve 14 to obstruct the easy and quick removal of the piston air sealing cup 17' and follower plate 17$^\times$ for cup replacement purposes upon the base plate or cap of the outer cylinder being detached, and nothing to increase the available area at the lower end of the sleeve 14 against which air pressure may act.

The arrangement of the outer cylinder, sleeve, piston and piston rod insures that a minimum amount of air is required for operating purposes and that there will be a minimum of non-continuous movement of the rising piston and sleeve under the lifting pressure of the admitted air, the latter being due to the fact that by virtue of the arrangement there is no stage during the rising movement where the movement is appreciably stopped while air pressure builds up.

Further it will be seen that the structure provided permits, upon the detachment of the bar 35, of the ready removal in the upward direction of the piston rod, piston and sleeve 14 and this without molesting in any way the outer cylinder, its supports or bracing members.

The piston 17 is supplied with a duct 17² which allows condensing or other liquids which may accumulate in the cylindrical piston rod to drain out to the wall of the sleeve 14. Here the liquid is spread over the inner wall of the latter sleeve in the movement upwardly of the piston, and on the down movement of the piston is picked up and discharged into the lower end of the outer cylinder where it can be drained off from time to time.

Due to variation in sleigh design, it may occasionally be very desirable to have the sleigh attachment rise bodily with the hoist entirely clear of the platform and at a time when the attachment has reached a certain canted position. In order to do this the rear part of the cradle is supplied with a pair of downwardly extending suitably interbraced bars forming a rack 56 carried centrally by the cradle. This rack rises with the cradle and interferes in no way with the under structure of the hoist or platform. Provision is also made so that the engaged catch 28 and hooked bar 47 cannot pass out of engagement, this being accomplished by passing a bolt loosely through receiving openings 58 supplied in the latter parts. When it is desired that the sleigh attachment rise bodily with the hoist and clear of the platform, and at the time the desired canted position has been reached, a pair of struts are utilized to connect the sides of the lower end of the rack and the sides of the sleigh attachment, such struts being shown in an angular position and in dotted outline in Fig. 27 and being indicated by the reference number 59. When the struts are functioning, the sleigh attachment is compelled to rise bodily with the hoist and clear of the platform, by the bracket like supporting structure so provided. Obviously the struts will require to go out of commission as the hoist returns and this can be accomplished either manually or automatically at the proper time.

What we claim as our invention is:

1. In a grain dump, a pneumatic air actuated hoist, said hoist embodying an upwardly directed open ended bearing, a cylinder with a base depending from said bearing, a sleeve open at both ends floatingly telescoped within said cylinder, a piston with a piston rod mounted to slide telescopically within said sleeve, and a wheel receiving platform mounted on said rod for hoisting front ends of vehicles.

2. In the combination claimed in claim 1, a packing gland in said bearing adjacent the upper end thereof slidably engaging said sleeve.

3. In the combination claimed in claim 1, means on the upper end of said sleeve extending above said bearing and stop means affixed to the first-mentioned means, externally of said cylinder, said stop means extending below said bearing and being engageable therewith upon predetermined upward movement of said sleeve.

4. In the combination claimed in claim 1, a wheel stop extending upwardly from one end of said platform, said platform being inclined downwardly towards said stop.

AUGUST P. WINTER.
NICHOLAS ROBERT SLASOR.